Sept. 25, 1956 P. M. LEMOIGNE 2,764,375

PARACHUTE

Filed April 27, 1953 7 Sheets-Sheet 1

Inventor
P. M. Lemoigne
By Glascock Downing & Seebold
Attys

Sept. 25, 1956 P. M. LEMOIGNE 2,764,375

PARACHUTE

Filed April 27, 1953 7 Sheets-Sheet 2

Inventor
P. M. Lemoigne
By Glascock Downing & Seebold
Attys.

Sept. 25, 1956 P. M. LEMOIGNE 2,764,375

PARACHUTE

Filed April 27, 1953 7 Sheets-Sheet 3

Inventor
P. M. Lemoigne
By Glascock Downing & Seebold
Attys.

Sept. 25, 1956 P. M. LEMOIGNE 2,764,375

PARACHUTE

Filed April 27, 1953 7 Sheets-Sheet 4

Inventor
P. M. Lemoigne
By Glascock Downing & Seebold
Attys.

Sept. 25, 1956 P. M. LEMOIGNE 2,764,375

PARACHUTE

Filed April 27, 1953 7 Sheets-Sheet 5

Inventor
P. M. Lemoigne
By Glascock Downing & Seebold
Attys.

Inventor
P. M. Lemoigne
By Glascock Downing & Seebold
Attys.

Sept. 25, 1956 P. M. LEMOIGNE 2,764,375

PARACHUTE

Filed April 27, 1953 7 Sheets-Sheet 7

Inventor
P. M. Lemoigne
By Glascock Downing & Seebold
Attys

United States Patent Office 2,764,375
Patented Sept. 25, 1956

2,764,375

PARACHUTE

Pierre Marcel Lemoigne, Montrouge, Seine, France

Application April 27, 1953, Serial No. 351,125
Claims priority, application France May 5, 1952
1 Claim. (Cl. 244—145)

This invention relates to parachutes and has for its main object to provide the canopy of a parachute with air conducting means including deflecting surfaces and/or nozzles and air outlets to control the direction and rate of flow of air through the parachute, so as to increase the parachuting power or deceleration force per unit of cloth area of said parachute.

Another object of the invention is to make said air conducting means and/or outlets elastically or, otherwise, deformable, so that the load shock to which the parachutist and component parts of the equipment are subjected, upon opening of the parachute canopy, is very much less than that encountered when using known forms of parachutes.

A further object of the invention is to distribute the above-mentioned air conducting means uniformly around the parachute so as to improve its stability during the descent.

Still a further object of the invention is to provide the shroud lines of a parachute with deflecting control surfaces to thereby ensure a safe opening of the parachute.

With these and other objects in view, in one embodiment of the invention, the above-mentioned air conducting means are constituted by accelerating nozzles fed at one end through suitable apertures from the inner space of the canopy and having their other end oriented towards the top of the canopy.

In another embodiment of the invention, said nozzles are surmounted by a deflecting ring adapted to deviate the jets of air escaping through said nozzles downwardly and outwardly to thereby create a reacting lift component. Alternatively, said deflecting ring may be used without the nozzles, in which case said ring will be fed directly from an anular aperture provided in the canopy underneath said ring.

In other embodiments of the invention, the inner central area of the canopy, that constitutes the shock-surface, i. e. the surface which is subjected to the impact of air upon opening of the parachute, is deformed into a cone-like surface, so as to spread smoothly the air entering the canopy to thereby reduce the shock due to said impact.

The above-mentioned cone-like deformation is conveniently provided by means of one or more additional central suspension lines attached, if desired through supplemental resilient shock-absorbing means, to the harness. Alternatively, said additional central suspension lines may be connected with the usual shroud lines of the canopy to thereby permit periodic deformation of the same including a cyclic extension of the edge of the canopy. This arrangement permits imparting the canopy with decelerating cyclic pulsations improving the parachuting power.

The above-described inner cone-like deflecting surface may be combined or not with the previously described nozzles and/or outer deflecting ring.

A more particular object of the invention is to provide, on the top of the canopy, a flap-valve adapted to be opened automatically upon impact of air thereon and to shut again automatically thereafter to reconstitute the normal outline of the canopy.

In order that the invention may be well understood, I will now describe, by way of example, some embodiments thereof with reference to the accompanying drawings, in which:

Fig. 1 is a vertical sectional view of a parachute provided with accelerating exhaust nozzles and hand-controlled means for deforming into a cone-like surface the central inner area of the canopy;

Fig. 1*a* is an enlarged fragmentary vertical sectional view of the arrangement shown in Fig. 1, the view being taken on line 1*a*—1*a* of Fig. 1*b*;

Fig. 1*b* is a fragmentary top plan view of the arrangement shown in Fig. 1*a*;

Figure 1:
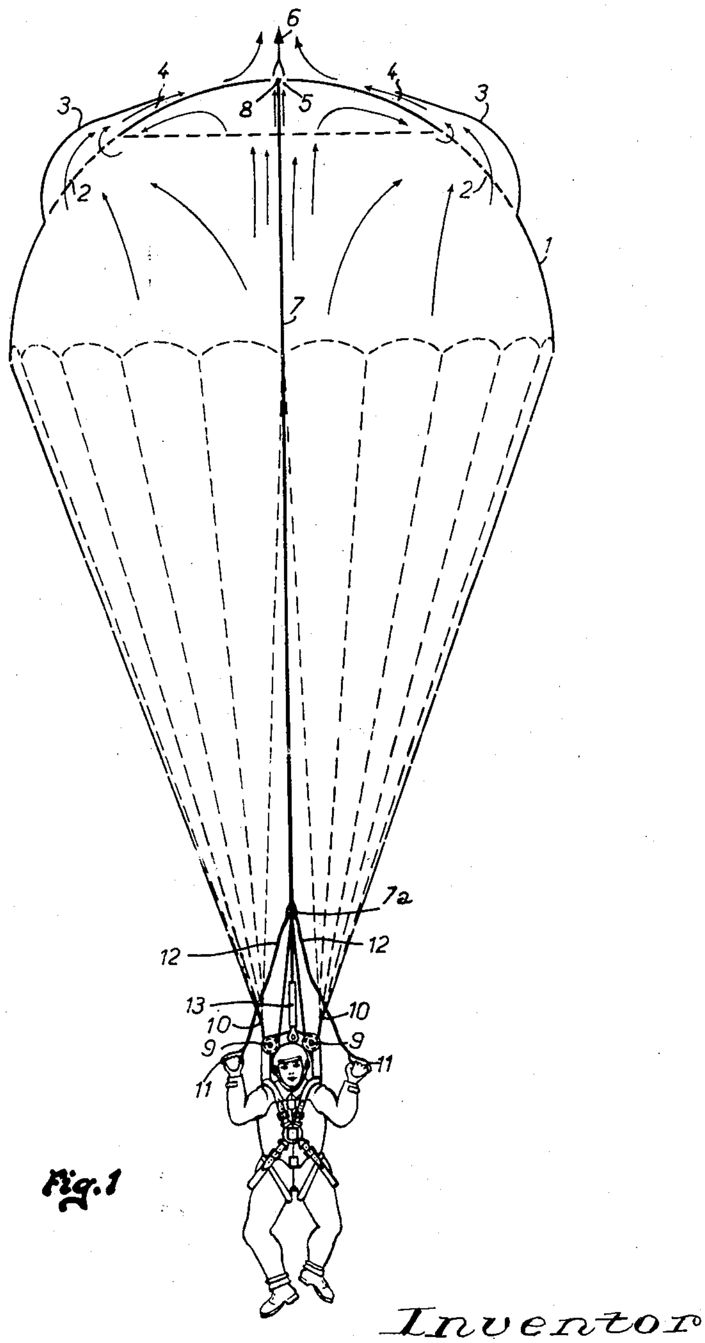
Figure 1A:
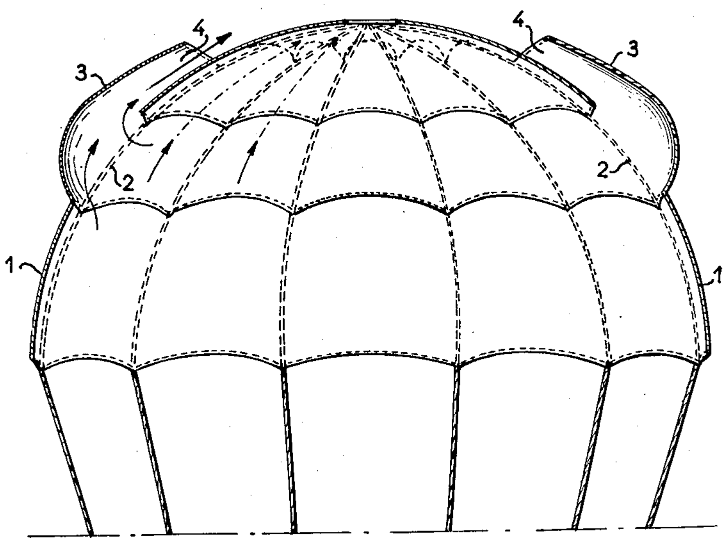
Figure 1B:
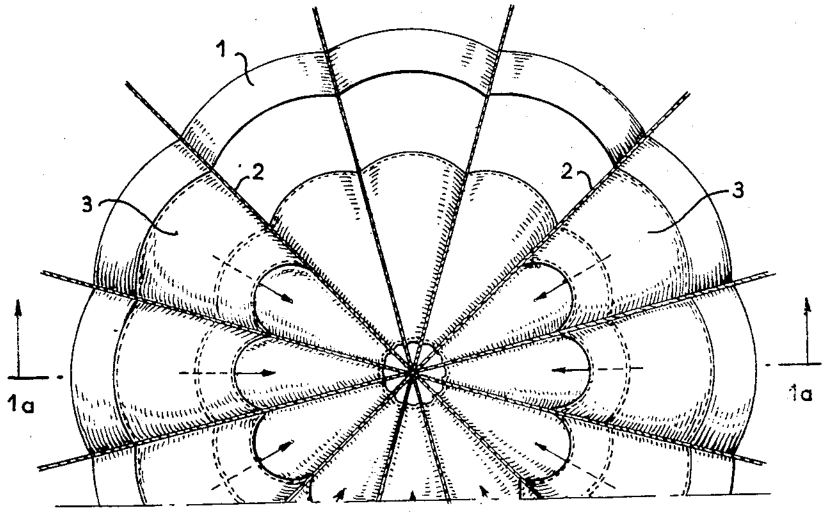

In the example shown in Fig. 1, there are shown at 1 the parachute canopy and at 2 an annular band of openings communicating the inner space of said canopy with second canopy element or nozzles 3 the function of which is to accelerate the flow of air escaping therethrough. This second canopy element is secured to canopy 1 at the lower or outer edge so that all of the air passing through auxiliary vents 2 is directed tangentially upwardly toward the center of canopy 1 as shown by the arrows.

In this embodiment, to avoid eddy currents resulting from shocks between the air jets escaping from the nozzles, a small additional central vent 5 has been provided to provide, as shown at 6, a sufficient additional exhaust of air to carry said jets of air away.

It is to be noted that the nozzles are distributed uniformly around the canopy so as to ensure a maximum of stability during the descent.

As mentioned in the preamble, one object of the invention is to provide means to deform the inner central surface of the canopy by exerting thereon periodic pulls associated with extensions of the canopy edge, so as to create decelerating pulsations.

In the example shown in Fig. 1, such pulsating pulls may be effected by the parachutist by means of a central suspension line 7 attached under the top of the canopy at 8 and subdivided at **7*a* into two threads, passing over pulleys 9 to be secured to the usual shroud lines at 10. Two handles 11 are connected through cables 12 to the above-mentioned central suspension line at 7*a***.

Finally, in the example shown, shock absorbing elastic means 13 are interposed between point **7*a*** and the harness of the parachutist.

This arrangement permits providing, for each pull exerted on the central suspension line 7, the formation of a kind of deflecting cone in the bottom of the canopy, while in the same time the shroud lines secured at their upper end to the edge of the canopy are extended upwardly, thus permitting expansion of the opening area of the parachute.

Figure 2:
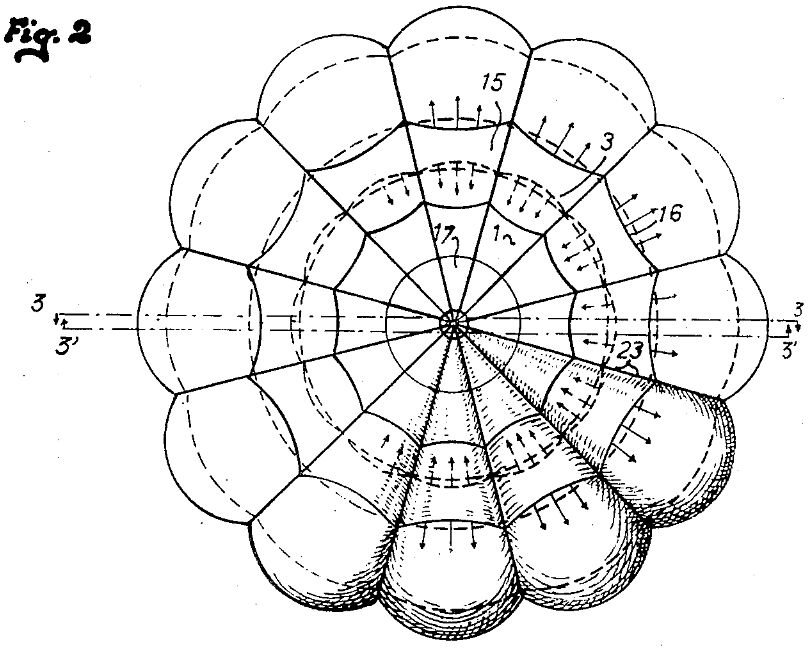
Fig. 2 is a top view of another embodiment in which the parachute is provided with an automatic central flap-valve and an outer deflecting ring fed from nozzles of the type shown in Fig. 1.
Figure 3:
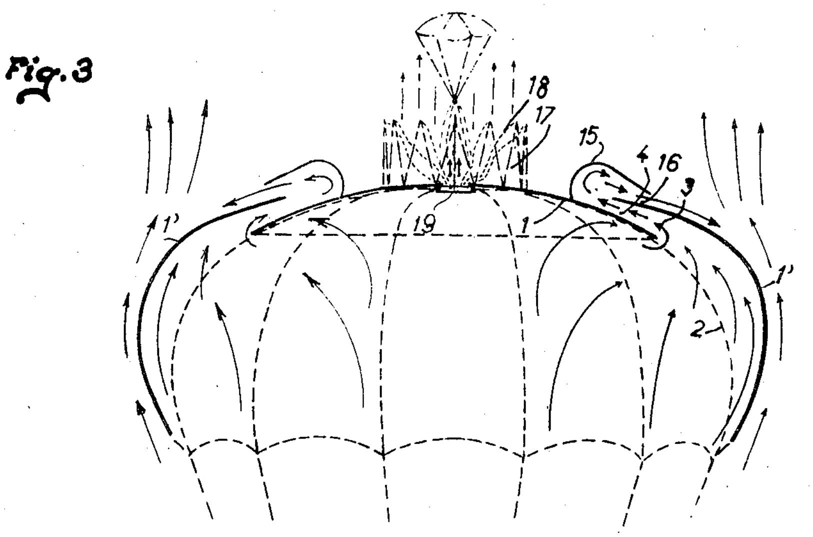
Fig. 3 is a vertical sectional view along line 3—3 of Fig. 2.

In the embodiment shown in Figs. 2 and 3, the parachute according to the invention is constituted by a first central canopy 1 having the shape of a dome and by a second annular canopy 1' coaxial with the first one, said canopies being radially secured together along the usual shroud lines 23, so as to provide accelerating nozzles 3—4. The outlets 4 of said nozzles are surmounted by a deflecting outer ring 15 deviating the air jets from said nozzles outwardly and downwardly through the annular slot 16 between the trailing edge of ring 15 and the outer surface of the annular canopy 1'.

In the embodiment shown in Figs. 2 and 3 the top of the canopy is provided with a central flap-valve which is used as a shock absorbing means and which is constituted, in the example shown, by triangular flaps 17 cut in the canopy and capable of opening upwards upon spreading of the canopy to provide an additional outlet to absorb the boost of pressure due to the opening shock.

The reconstitution of the canopy is ensured by pulling means such as ropes 18 attached to the free apex of the triangular flaps 17 and passing through a ring 19, said pulling means being actuated either manually by the parachutist or by any convenient mechanical device from the parachute harness or again from a shock absorbing pilot parachute, as shown in dotted line. This reconstitution permits re-establishing the usual negative-pressure zone above the parachute.

Figure 5:
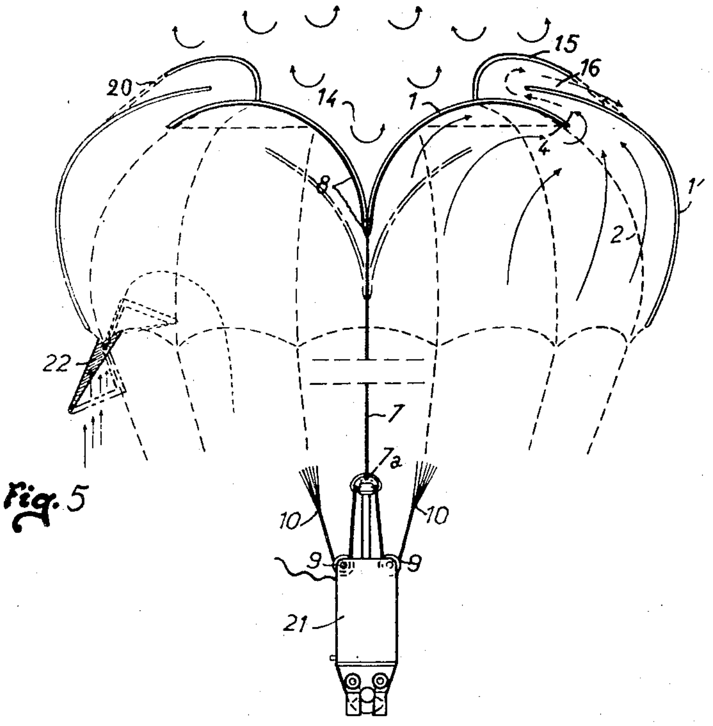
Fig. 5 is a partial sectional view along line 5—5 of Fig. 4 showing mechanical means to deform the canopy, as well as additional safety opening means.
Figure 4:
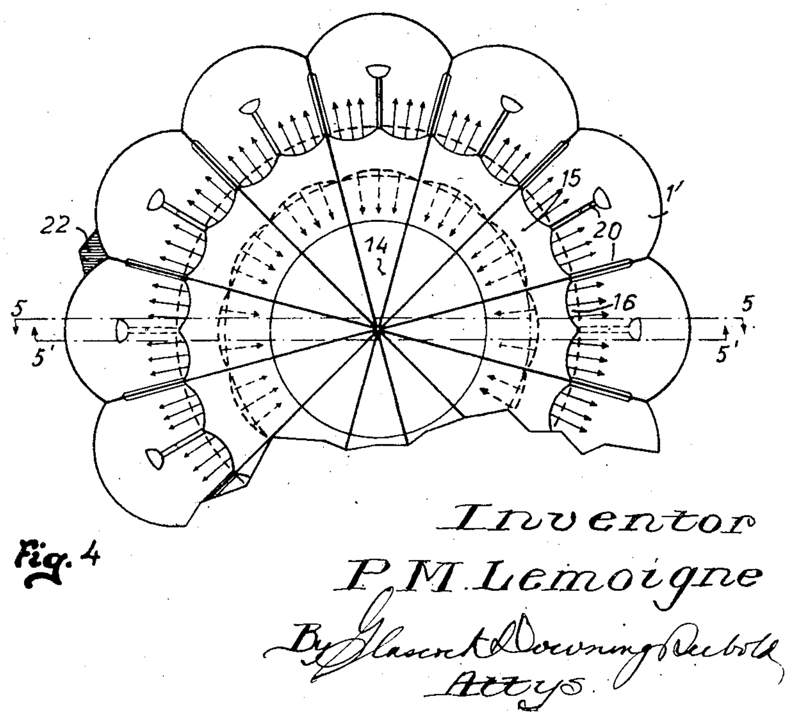
Fig. 4 is a partial top view of another embodiment comprising a permanent deflecting cone-like inner surface, accelerating nozzles and an outer deflecting ring.

Figs. 4 and 5 illustrate another embodiment of a canopy, the inner central area or shock-surface of which is permanently shaped into a deflecting cone-like surface having concave generatrices. For this purpose, the apex 8 of said cone-like surface is connected through at least one central suspension line 7, e. g. as shown at 7*a*, with the piston rod of an alternating motor 21 to which the parachuted load is suspended. This arrangement permits imparting the canopy with decelerating pulsations.

There is shown at 22 one of the deflecting control surfaces which may be distributed around the canopy near its leading edge to ensure a safe opening of the parachute. Said control surfaces are so mounted on the suspension lines that, upon straightening of the latter, they automatically offer to the incoming air such an angle of incidence as to be capable of causing, on the one hand, by yielding under air pressure a safe spreading of the canopy and, on the other hand, a deviation of the incoming air towards the inner space of said canopy.

Figure 7:
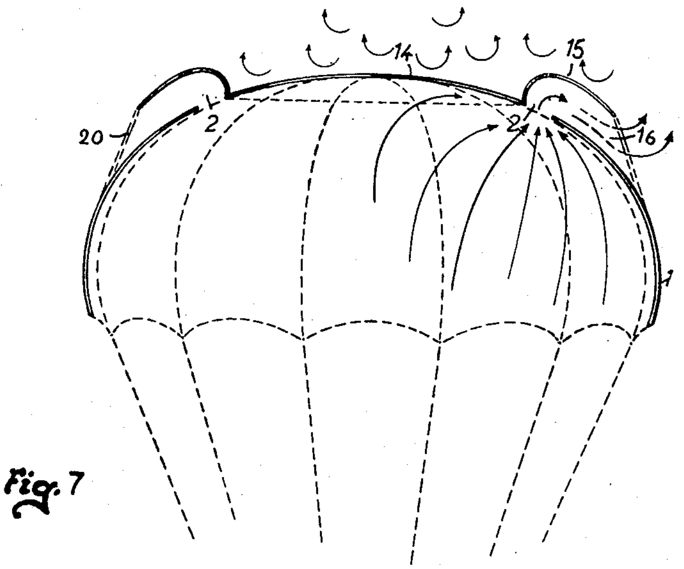
Fig. 7 is a sectional view along line 7—7 of Fig. 6.
Figure 6:
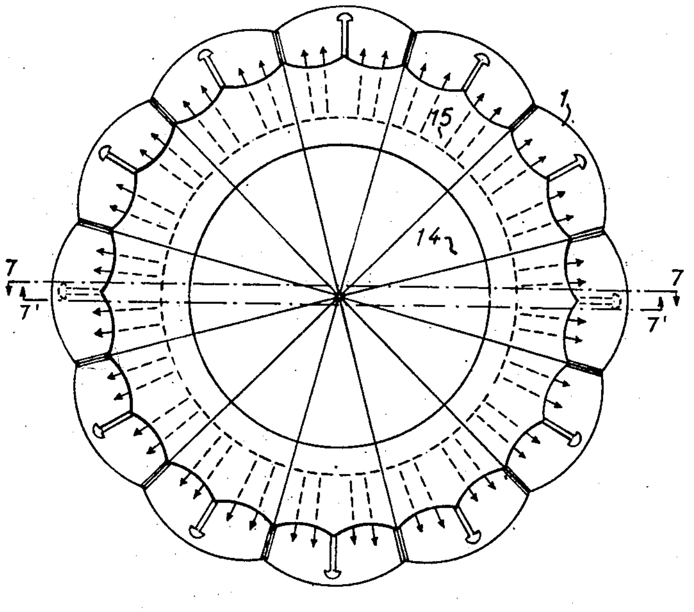
Fig. 6 is a top view of a parachute provided with an outer deflecting ring.

In the simplified embodiment shown in Figs. 6 and 7 the parachute comprises only one canopy. In this example, air is projected through air annular outlet 2 against a deflecting ring 15 that deviates said air outwardly and downwardly, so as to create, as previously, a negative-pressure zone 14 above the parachute and a reacting lift component increasing the parachuting power.

In the embodiment shown in Figs. 8 to 10, two suspension lines 7*a* are secured at 3 to the central inner area of canopy 1, which assumes in permanence the shape of a cone-like surface, as in the embodiment described with reference to Figs. 4 and 5, the inner walls of the annular inner space thus formed feeding an annular opening 24 through which the air is ejected. The jets of air are then directed downwards and outwards, as previously, by means of a deflecting ring 15, the trailing edge of which is connected to the outer surface of canopy 1 through ropes 20 which may be made of elastic material to permit elastic shock-absorbing yielding of ring 15. The deflecting ring 15 is constituted, in this example, as more clearly shown in Fig. 9, by strips 25 extending radially and interconnected by means of two circular ribbons 26, the whole assembly constituting a grid-like structure capable of being deformed elastically under the shock on opening of the parachute.

Figures 8, 9, 10:
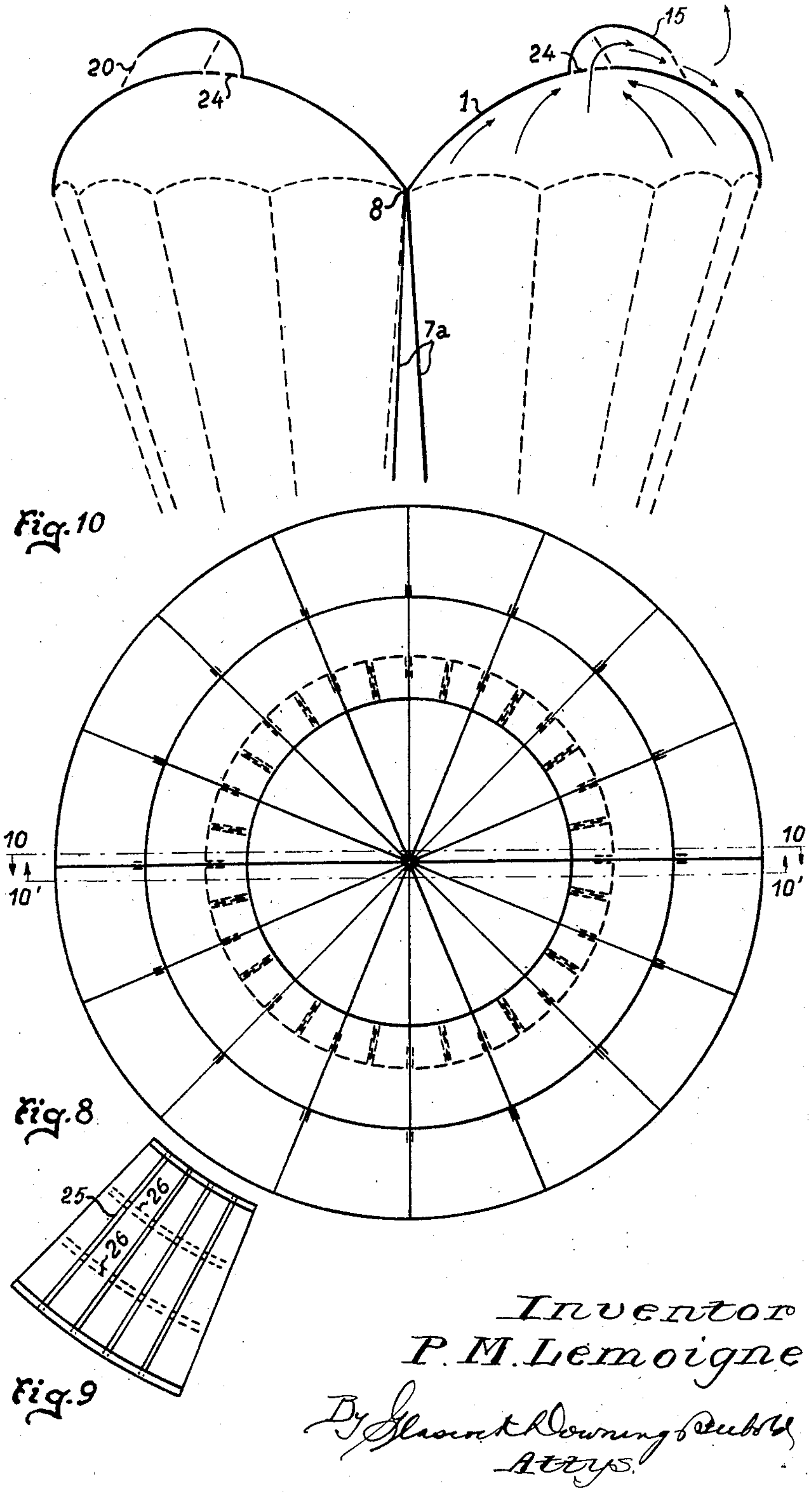
Fig. 8 is a top view of a modification of the parachute shown in Figs. 4 and 5.
Fig. 9 is a partial detail view of the outer deflecting ring of the parachute shown in Fig. 8.
Fig. 10 is a sectional view along line 10—10 of Fig. 8.
Figures 11, 12:
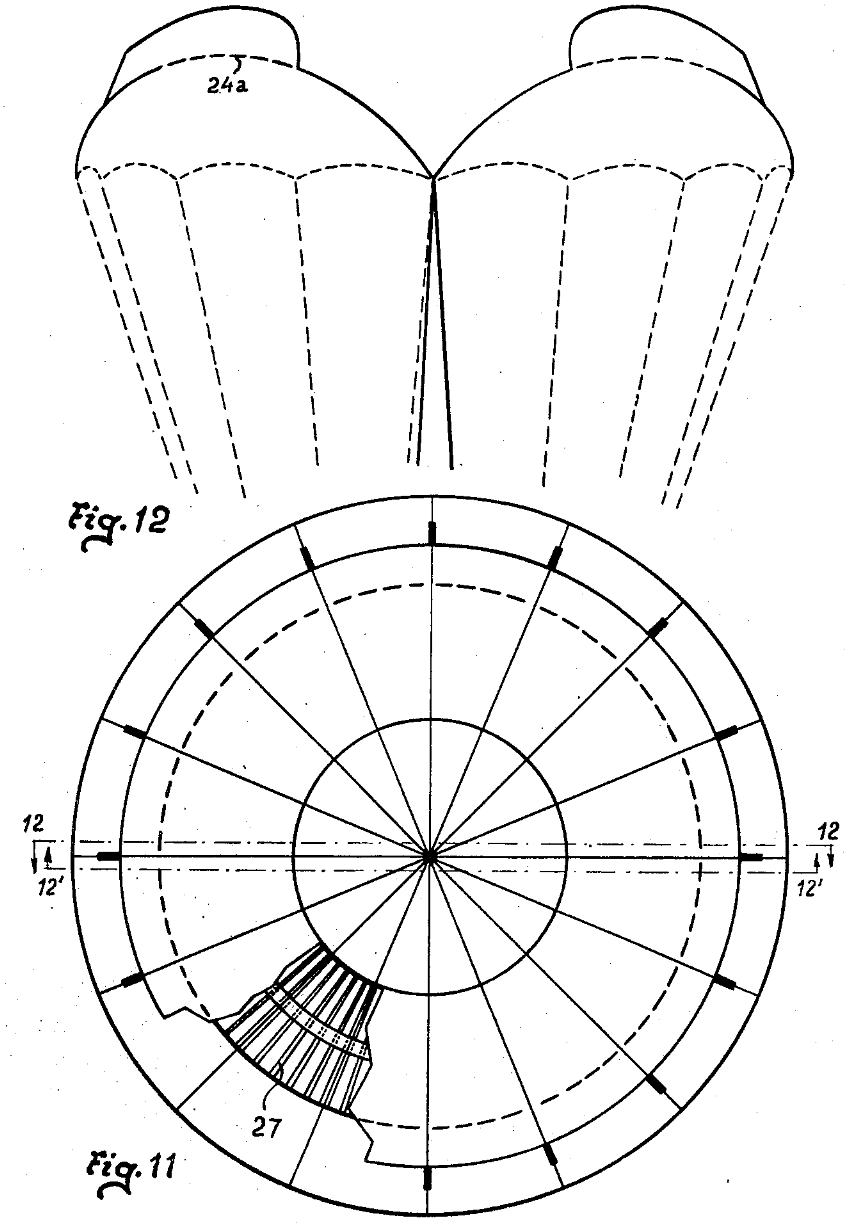
Fig. 11 is an alternative constructive embodiment of Figs. 8 and 10.
Fig. 12 is a sectional view along line 12—12 of Fig. 11.

In the alternative embodiment shown in Figs. 11 and 12, the annular opening 24*a* is constituted by a similar grid-like elastic structure 27, this arrangement being combined, if desired, with that of Figs. 8 to 10.

The invention and, more particularly, the two last described embodiments permit providing a parachute offering the main following advantages:

(1) The descending speed is suitably decelerated due to the fact that, for a given cloth area, there is obtained a maximum area of the air inlet opening due to the deformation obtained by means of at least one central suspension line having a suitable length (said area being easily varied, if and when desired, by a simple pull exerted on said central suspension line).

(2) The "opening shock" is materially reduced thanks to

*a*. The cone-like shape of the central shock-surface on which the impact of the incoming air takes place in an oblique direction;

*b*. The various elastic means provided to ensure a real "automatic absorption" of the opening shock, said elastic means ensuring, furthermore, a better stability, in particular, when the parachute is subjected to atmospheric boisterousness;

(3) The stability of the descent is further considerably improved, thanks to the annular distribution of the air outlets and to the deflecting ring which is fed with the air escaping through said outlets, deflection of the air jets by means of said ring having, not only a reacting but also a stabilizing effect.

Finally, in the examples shown in Figs. 8 to 12, it is possible to obtain a safer opening by giving the central suspension lines a shorter length than to the peripheral shroud lines, so that, when the parachute is extracted from its pack, its cone apex projects from its leading edge, thus causing a deflecting action deviating the air threads against the inner wall of said leading edge.

The parachute according to the invention is particularly to be used for stabilizing, e. g. an ejected seat, for opposing spins of the plane, for braking aircraft on landing, for parachuting airborne paratroops and as personal life preserver or cargo landing parachute.

What is claimed is:

In a parachute construction, a substantially semispherical canopy comprising a peak portion constituted by a plurality of panel sections of substantially triangular shape, a corresponding number of shroud lines extending across said peak portion, a lower skirt portion constituted by a corresponding number of panel sections of substantially rhomboidal shape connected to said shroud lines and radially spaced from said peak portion to define therewith an annular air vent, and an intermediate portion constituted by a corresponding number of panel sections connected to said shroud lines and to said skirt portion and shaped so as to extend radially from said skirt portion over said vent and over a marginal portion of said peak portion to form with said marginal portion a plurality of passages of tapering cross-section adapted to reduce the velocity of the flow of air entering the passages from the interior of the canopy and to direct said flow of air outwardly of the canopy toward the center thereof.

References Cited in the file of this patent

UNITED STATES PATENTS

| | | |
|---|---|---|
| 1,586,561 | Lucas | June 1, 1926 |
| 1,832,180 | Broadwick | Nov. 17, 1931 |
| 2,283,479 | Westenhaver | May 19, 1942 |
| 2,358,417 | Quilter | Sept. 19, 1944 |
| 2,392,946 | Quilter | Jan. 15, 1946 |
| 2,447,187 | Kunkler | Aug. 17, 1948 |
| 2,472,601 | Mallory | June 7, 1949 |
| 2,527,553 | Ingels | Oct. 31, 1950 |
| 2,559,804 | Smith | July 10, 1951 |

FOREIGN PATENTS

| | | |
|---|---|---|
| 640,891 | France | Apr. 7, 1928 |
| 874,033 | France | Apr. 13, 1942 |
| 344,591 | Germany | Nov. 25, 1921 |